(12) United States Patent
Maguire et al.

(10) Patent No.: US 11,001,425 B2
(45) Date of Patent: May 11, 2021

(54) APPARATUS FOR INTRODUCING AN ADDITIVE TO A CARBONATED LIQUID

(71) Applicant: Gizmo Packaging Limited, Glasgow (GB)

(72) Inventors: Jordan Maguire, Glasgow (GB); Bernard Frutin, Glasgow (GB)

(73) Assignee: Gizmo Packaging Limited, Glasgow (GB)

( * ) Notice: Subject to any disclaimer, the term of this patent is extended or adjusted under 35 U.S.C. 154(b) by 0 days.

(21) Appl. No.: 16/483,648

(22) PCT Filed: Feb. 5, 2018

(86) PCT No.: PCT/GB2018/050325
§ 371 (c)(1),
(2) Date: Aug. 5, 2019

(87) PCT Pub. No.: WO2018/146459
PCT Pub. Date: Aug. 16, 2018

(65) Prior Publication Data
US 2020/0122908 A1    Apr. 23, 2020

(30) Foreign Application Priority Data
Feb. 7, 2017   (GB) ..................................... 1702009

(51) Int. Cl.
*B65D 51/28*    (2006.01)
*A23L 2/52*    (2006.01)
(Continued)

(52) U.S. Cl.
CPC ............ *B65D 51/2864* (2013.01); *A23L 2/52* (2013.01); *B01F 3/0865* (2013.01);
(Continued)

(58) Field of Classification Search
None
See application file for complete search history.

(56) References Cited

U.S. PATENT DOCUMENTS 7,588,142 B1 * 9/2009 Bush .................. B65D 51/2857
206/221
10,472,134 B1 * 11/2019 Bergida ............. B65D 41/0435
(Continued)

FOREIGN PATENT DOCUMENTS

DE    102014113392 A1    11/2015
DE    102016102247 A1    8/2016
(Continued)

OTHER PUBLICATIONS

International Preliminary Report on Patentability—Written Opinion of the International Searching Authority for PCT/GB2018/050325, dated Aug. 13, 2019, 7 pages.
(Continued)

*Primary Examiner* — Viren A Thakur
(74) *Attorney, Agent, or Firm* — Faegre Drinker Biddle & Reath LLP

(57) ABSTRACT

A closure device for firing an additive into a carbonated beverage bottle with a neck comprises a cap member and a housing. The cap member includes a pressurised tank containing the additive and a propellant and has a bottom aperture. The housing engages with the neck and includes a plug member which engages with the bottom aperture. The cap member can be lifted relative to the housing from a first armed or closed position in which the plug member closes the bottom aperture to a second firing position in which the plug member provides a communication path from the tank through a nozzle in the plug member.

16 Claims, 6 Drawing Sheets

(51) Int. Cl.
  *B01F 3/08* (2006.01)
  *B65D 51/16* (2006.01)
  *B01F 5/02* (2006.01)
  *B65D 41/34* (2006.01)

(52) U.S. Cl.
  CPC ........ *B01F 5/0281* (2013.01); *B65D 41/3447* (2013.01); *B65D 51/1683* (2013.01); *A23V 2002/00* (2013.01); *B01F 2215/0022* (2013.01)

(56) References Cited

U.S. PATENT DOCUMENTS

| | | | |
|---|---|---|---|
| 2008/0011708 A1* | 1/2008 | Rappin | B65D 51/1616 215/308 |
| 2009/0321286 A1* | 12/2009 | Frutin | B65D 51/2892 206/219 |
| 2010/0288766 A1 | 11/2010 | Seelhofer | |
| 2014/0110281 A1* | 4/2014 | Chen | B65D 51/2892 206/219 |
| 2014/0166510 A1* | 6/2014 | Frutin | B65D 83/00 206/221 |
| 2014/0263154 A1* | 9/2014 | Musumeci, Jr. | B65D 51/2892 215/250 |
| 2015/0083727 A1* | 3/2015 | Smolko | B65D 23/12 220/373 |
| 2017/0073133 A1 | 3/2017 | Presche | |
| 2017/0313481 A1* | 11/2017 | Kim | B65D 41/0442 |
| 2018/0044080 A1 | 2/2018 | Presche | |

FOREIGN PATENT DOCUMENTS

| | | | |
|---|---|---|---|
| WO | 2007129116 A1 | 11/2007 | |
| WO | 2009086652 A1 | 7/2009 | |
| WO | WO-2016068665 A1 * | 5/2016 | ......... B65D 51/1661 |

OTHER PUBLICATIONS

International Search Report and Written Opinion for PCT/GB2018/050325 dated Mar. 15, 2018, 11 pages.

* cited by examiner

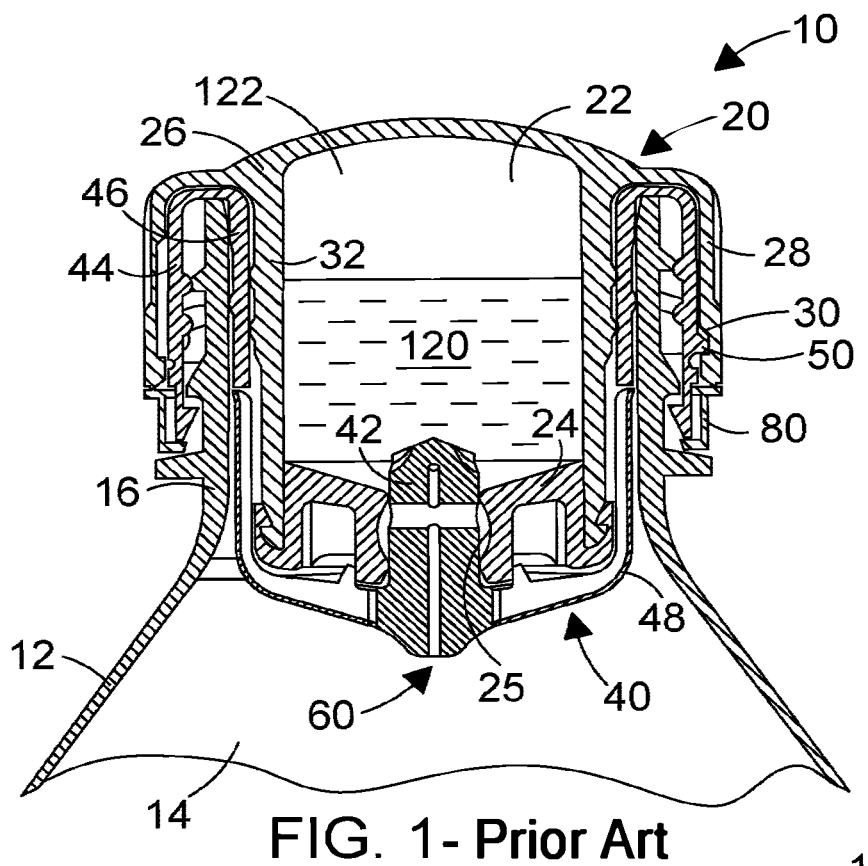
FIG. 1 - Prior Art
FIG. 2 - Prior Art

APPARATUS FOR INTRODUCING AN ADDITIVE TO A CARBONATED LIQUID

FIELD OF THE INVENTION

The present invention relates to a closure assembly, for use with a container containing a carbonated beverage or other liquid, which can fire an additive liquid from a pressurised tank of the closure assembly into a liquid in the container by operation of the closure assembly. The invention also relates to a method of introducing an additive liquid into a container by means of operating such a closure assembly.

BACKGROUND

In a number of applications, such as mixtures of different liquids, it may be necessary to release and mix an additive liquid into another liquid shortly before the liquid mixture is used. It may not be possible or desirable to store the liquids in a premixed form, as they may react undesirably with each other when stored as the mixture for a period of time. An example of this may be two component pharmaceuticals which have a longer shelf life when unmixed than they do when mixed. However, it can also apply to other liquids or to mixtures of liquids and gases, such as water, alcoholic beverages, other beverages, and other solvents or solutions. The term "beverage" when used in this specification includes any liquid, whether or not provided for drinking purposes, which may be mixed with an additive liquid, and is not limited to potable beverages.

A closure device for use with a beverage container which can release an additive liquid into the beverage by operation of the closure device is known from the prior art. International Patent Application WO2007/129116 discloses a closure device comprising a cap member defining a fluid chamber and housing which includes a plug member which sealingly engages an aperture in the bottom of the fluid chamber. The cap member is raised relative to the plug member by unscrewing the cap member, from a closed position in which the plug member closes the bottom aperture to an open position in which the plug member is partially withdrawn from the bottom aperture to allow pressurised fluid to flow from the fluid chamber through a nozzle passage in the plug member to the beverage in the beverage container.

The known device works best with still beverages. When it is used with a carbonated beverage, the injection of the pressurised fluid onto the surface of the carbonated beverage causes frothing of the beverage, such that the beverage can be forced under pressure between the fluid chamber and the housing to the underside of the cap member and then between the threaded wall of the cap member and the housing to escape and cause a leakage.

It is an object of the present invention to overcome one or more disadvantages of the known device.

SUMMARY OF THE INVENTION

According to a first aspect of the present invention there is provided a closure device for releasing an additive liquid into a main liquid compartment of a container having an opening with a neck, the assembled closure device comprising a cap member and a housing,
  wherein the cap member includes a pressurised tank containing the additive liquid and having a bottom aperture therein,
  wherein the housing is adapted to engage with the neck and includes a plug member sealingly engageable with the bottom aperture,
  wherein the plug member includes a nozzle directed away from the fluid chamber,
  wherein the cap member and housing are arranged to permit movement of the cap member relative to the housing from a first armed or closed position of the closure device in which the plug member closes the aperture to a second firing position of the closure device in which the plug member is at least partially withdrawn from the bottom aperture to provide a communication path in use from the tank through the nozzle to the main liquid compartment,
  characterised in that
  the closure device includes a first sealing means arranged on the cap member and a second sealing means arranged on the housing to provide a fluid seal between the housing and the cap member when the closure device is in the first armed position and to provide a fluid path between the housing and the cap member when the closure device is in the second firing position, and
  the housing includes one or more gas permeable apertures arranged in fluid communication between the fluid path and the main liquid compartment when the closure device is in the second firing position.

Preferably the one or more gas permeable apertures are substantially liquid impermeable, for example substantially impermeable to water at temperatures of between 5° C. and 50° C.

The pressurised tank is also referred to as a fluid chamber in this specification. The pressurised tank may contain a gaseous propellant and the additive liquid.

The cap member is also referred to as a closure in this specification.

The cap member may be provided with a primary engagement means which engages with a corresponding primary engagement means provided on the housing to allow the cap member to be rotated or lifted relative to the housing from the first armed or closed position of the closure device to the second firing position of the closure device.

The primary engagement means may comprise an internal thread on the outer wall of the cap member and an external thread on the outer wall of the housing. This permits lifting movement of the closure assembly from the first closed position to the second firing position by rotation of the cap member relative to the housing.

If the cap member is unscrewed from the housing, the threads cause the cap member and tank to move upwards relative to the plug member and housing, so that the closure assembly can move from the first closed position to the second firing position.

In an alternative embodiment, the primary engagement means may comprise a bayonet connection means comprising a first connection means on the outer wall of the cap member and a second connection means on the outer wall of the housing. The bayonet connection means permits rotation of the cap member relative to the housing from a first locking position which prevents lifting of the cap member relative to the housing to a second open position which permits lifting of the cap member relative to the housing, for example by the action of propellant in the pressurised tank.

In an alternative embodiment, the primary engagement means may comprise means which allows a simple sliding movement of the cap member relative to the housing to lift the cap member relative to the housing. The lifting movement may be prevented by a locking means, such as a tamper-evident band, which must first be removed to permit sliding movement of the cap member relative to the housing.

The first sealing means may be a circumferential rib on the underside of the cap member and the second sealing means may be a circumferential projection on the housing adapted to engage with the rib in the first closed position.

The first sealing means may be a resilient seal, typically an annular seal, provided on the underside of the cap member and the second sealing means may be a web member of the housing, typically an annular web extending over the neck of the container when the closure device is secured to the neck of the container, adapted to engage with the resilient seal in the first closed position.

Each of the one or more gas permeable apertures may be arranged in an inner cylindrical wall of the housing which surrounds the tank.

Each of the one or more gas permeable apertures may comprise an aperture closed by a gas permeable membrane. The gas permeable membrane may be arranged inside the aperture. The gas permeable membrane may be arranged to cover the aperture.

The gas permeable membrane may comprise any membrane material which permits the passage of gas therethrough but prevents the passage of liquid therethrough.

The gas permeable membrane may comprise sintered plastic. The plastic may be polypropylene, polyethylene or any other suitable material.

The pressurised tank may have an interior volume and a cylindrical wall, and the bottom aperture may comprise an open end of the cylindrical wall portion.

The plug member may include an annular channel adapted to sealingly engage with the open end of the cylindrical wall of the pressurised tank.

The nozzle may comprise one or more orifices provided in the annular channel.

The one or more orifices may be arranged to be sealed from the interior volume of the tank when the annular channel is sealingly engaged with the open end of the cylindrical wall in the first closed position of the closure assembly.

The one or more orifices may be arranged to be in fluid communication with the interior volume of the tank when the annular channel is separated from the open end of the cylindrical wall in a second firing position of the closure assembly.

The open end of the cylindrical tank wall and the annular channel effectively form a plug and socket, which serve to seal the orifices when the closure assembly is in the closed position, but open all the orifices simultaneously when the tank is raised relative to the plug member and the closure assembly is in the firing position.

The nozzle may comprise a plurality of orifices arranged in an annular pattern. Such an arrangement results in the additive liquid being ejected in a "shower head" pattern, to improve distribution and mixing of the additive liquid within the beverage or other liquid in the container.

The one or more orifices, or at least the outlets of the orifices, may be angled away from the vertical axis. The vertical axis is the longitudinal axis of the neck of the container. Such an arrangement results in the additive liquid being ejected in a direction such that it hits the wall of the neck of the container, minimising disturbance of the carbonated beverage and reducing frothing of the carbonated beverage or other liquid in the container.

The orifices or orifice outlets may be orthogonal to the vertical axis or may be arranged at an angle of between 0° and 90° to the vertical.

Preferably the plug member includes a stopper portion adapted to project inside the open end of the cylindrical wall of the pressurised tank in the first closed position. Such a stopper portion comprises a secure and positive seal to the pressurised tank.

The plug member may include a seal in the annular channel adapted to seal between the plug member and an internal surface of the cylindrical wall in the first closed position. Such a seal ensures that the tank cannot leak during storage of the closure assembly in its pressurised state, either before or after fitting to a container.

The plug member may include a seal in the annular channel adapted to seal between the plug member and an external surface of the cylindrical wall in the second firing position. Such a seal ensures when the additive is fired under pressure from the tank it cannot pass upwards outside the tank between the neck of the container and the tank.

The housing may include a sleeve portion which at least partially surrounds the pressurised tank. The housing can be secured to the neck of the container so that the plug member is fixed relative to the container. The tank can then be moved relative to the container to achieve movement of the closure assembly from the closed position to the firing position.

The housing may include a cylindrical inner wall adapted to fit inside a neck of a container and a cylindrical outer wall connected to the inner wall by a bridge portion, the outer wall having an internal thread on its inner surface adapted to engage with an external thread on a neck of a container.

The cap member may have an outer wall adapted to fit around the outer wall of the housing. The outer wall of the cap member may have a detent member for engaging a corresponding detent member on the outer wall of the housing, the detent members being adapted to hold the closure assembly in the first closed position.

The detent member on the outer wall of the cap member may be provided on a frangible portion of the cap member, such that removal of the frangible portion of the cap member permits movement of the closure assembly from the first closed position to the second firing position.

If the detent members are all that prevent relative vertical movement of the cap member and the housing, then removal of the frangible portion allows the cap member and tank to move upwards relative to the plug member and housing under the internal pressure of the contents of the tank, so that the closure assembly can move from the first closed position to the second firing position.

The cylindrical inner wall of the housing may have a first circumferential rib on its inner surface adapted to engage with a first detent portion provided on an external surface of the cylindrical wall of the pressurised tank when the closure assembly is in the second firing position to prevent the tank separating from the housing.

The first rib and first detent portion prevent the tank from separating from the housing after firing of the closure assembly.

According to a second aspect of the present invention there is provided a container comprising a main liquid compartment and having an opening with a neck, the container being closed by a closure device according to the first aspect secured to the neck of the container, wherein the main liquid compartment contains a carbonated liquid or beverage.

According to a third aspect of the present invention there is provided a method of introducing an additive liquid into a carbonated beverage in a main liquid compartment of a container having an opening with a neck, the neck being closed by a closure device comprising a cap member and a housing secured to the neck of the container,
- wherein the cap member includes a pressurised tank containing the additive liquid and a propellant, and having a bottom aperture therein,
- wherein the housing includes a plug member sealingly engageable with the bottom aperture,
- wherein the plug member includes a nozzle directed away from the fluid chamber,
- the method comprising the steps of:
  - moving the cap member relative to the housing from a first armed or closed position of the closure device in which the plug member closes the aperture to a second firing position of the closure device in which the plug member is at least partially withdrawn from the bottom aperture to provide a communication path in use from the tank through the nozzle to the main liquid compartment,
  - firing the liquid additive under action of the propellant into the main liquid compartment, thereby mixing the liquid additive with the carbonated beverage,
  - opening a vent path from the main liquid compartment to the outside of the container through a gap between the cap member and housing, wherein the vent path includes one or more gas permeable apertures arranged in fluid communication with the main liquid compartment,
  - permitting gas to pass through the one or more gas permeable apertures along the vent path to the outside of the container to reduce the pressure inside the main liquid compartment to atmospheric pressure, and
  - simultaneously preventing the carbonated beverage from passing through the one or more gas permeable apertures along the vent path to the outside of the container.

The method may include the further step of removing the closure device from the neck of the container after the pressure inside the main liquid compartment has been reduced to atmospheric pressure.

The step of opening a vent path from the main liquid compartment to the outside of the container through a gap between the cap member and housing may include separating a first sealing means arranged on the cap member from a second sealing means arranged on the housing.

The closure device may be a closure device according to the first aspect of the invention.

BRIEF DESCRIPTION OF THE DRAWINGS

The invention will be described, by way of example only, with reference to the drawings in which:

FIGS. 1 and 2 are cross-sectional views through a prior art closure device secured to the neck of a container in a closed and in a firing position respectively;

DETAILED DESCRIPTION

Figure 3:
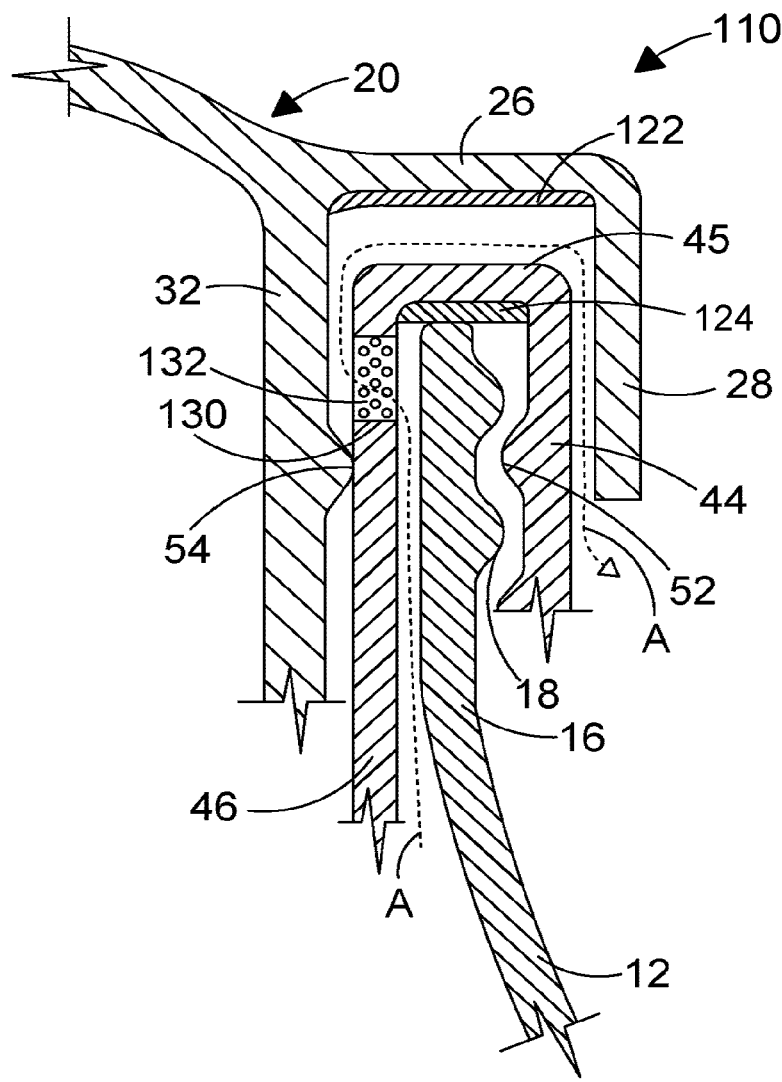
FIG. 3 is partial cross-section through a closure device according to the invention in a firing position.

Referring to FIGS. 1 and 2, there is illustrated the known closure device 10 of WO2007/129116. Many features of the closure device are common to the closure device 110 of the embodiment of the present invention illustrated in FIG. 3, and so are described in detail below. The closure device 10, 110 is secured to the neck 16 of a container or bottle 12. The closure device 10, 110 comprises two main parts, a cap member 20, which defines a fluid chamber 22, and a housing 40. The cap member 20 includes an aperture 25 provided in its bottom wall 24. The cap member 20 includes a top cap wall 26, an outer cap wall 28, and an inner cap wall 32. The outer cap wall 28 includes an internal primary thread 30 adapted to engage a corresponding external primary thread 50 on the housing 40. Together the internal and external primary threads 30, 50 form part of the primary engagement means which allow the cap member 20 to be lifted relative to the housing 40.

The housing 40 comprises a plug member 42 arranged on the central axis of the closure device 10, 110, an outer housing wall 44 adapted to fit outside the neck 16, a web 45 which sits on top of the neck 15, an inner housing wall 46 which extends down from the web 45 inside the neck and which seals against the neck 16, and a frame 48 which extends from the inner housing wall 46 and supports the plug member 42.

The outer housing wall 44 has an internal secondary thread 52 which engages the external secondary thread 18 on the neck 16 of the container.

Internal sealing means 54 are provided to seal between the inner cap wall 32 and the inner housing wall 44. In the illustrated example the internal sealing means 54 are formed as ribs on the outer surface of the inner cap wall, but they could be formed as ribs on the inner surface of the inner housing wall, or as any other suitable sealing means. The internal sealing means 54 prevents the contents of the container 12 passing between the inner cap wall 32 and the inner housing wall 44 during storage and while the cap member 20 is raised relative to the housing 40.

The plug member 42 has a nozzle 60 extending below it. A nozzle passage 61 is provided to convey pressurised liquid from the fluid chamber 22 when the closure device is opened. The plug member 42 is formed with a cylindrical outer surface 62, which engages sealingly with the aperture 25 in the bottom wall 24.

In the closed position of FIG. 1 the plug member 42 is sealingly engaged with an upper seal 66 on the cylindrical outer surface 62 above an internal fluid passage 70 in the nozzle 60.

The upper surface 76 of the bottom wall 24 slopes towards the plug member 42, so that all the liquid is drained from the fluid chamber 22 when the plug member is in the open position.

At the lower edge of the outer cap wall 28 is an anti-tamper strip 80, which is an extension of the outer cap wall 28, and which engages the underside of the outer housing wall 44 by a detent flange. Such anti-tamper strips are known in the art and are not described further. Until the anti-tamper strip 80 is at least partially removed, the cap member 20 cannot be unscrewed from the housing 40. Once the anti-tamper strip 80 is at least partially removed the cap member 20 can be unscrewed from the housing 40 by interaction of the internal thread 30 on the cap and the external thread 50 on the housing. The threads include mutually engaging detent means 90, 92, best seen in FIG. 2, which serve to limit the relative rotation of the cap member 20 and housing 40.

At the lower edge of the outer housing wall 44 is provided a further anti-tamper device 100, which is an extension of the outer housing wall 44, connected by one or more neck portions 104, and includes a detent flange which engages a corresponding detent means provided on the container neck 16. Such anti-tamper devices are known in the art and are not described further. A predetermined torque applied to the cap member 20 is required to separate the anti-tamper device 100 and allow the housing 40 to be raised on the secondary threads 18, 52 relative to the neck 16. The anti-tamper device 100 remains on the neck 16 of the container 12.

In FIG. 1 the closure device 10, 110 is secured to a container 12 containing a primary liquid (not shown), for example water, in its main liquid compartment 14. The fluid chamber 22 in the cap member contains a liquid additive 120 and a head space 122 of pressurised gas or other suitable propellant. The closure device 10, 110 is in the closed position, in which the fluid chamber 22 is sealed closed by the plug member 42 which is engaged in the aperture 25 in the bottom wall 24. The housing 40 is screwed fully onto the neck 16 through the secondary threads 18, 52, and the cap member 20 is screwed fully onto the outer housing wall 44 through the internal and external primary threads 30, 50. There is a seal 54 provided between the fluid chamber 22 and inner housing wall 46, and further seals are provided between the inner housing wall 46 and the neck 16 so that the contents of the container are sealed from the external atmosphere.

To trigger the firing of the liquid additive 120 into the main liquid compartment 14 of the container 12, the cap member 20 must be unscrewed relative to the housing 40 to the position shown in FIG. 2, typically through a first angle of 45°. First the anti-tamper strip 80 is at least partially removed so that the outer cap wall 28 is free to be raised relative to the outer housing wall 44. Then the cap member 20 is grasped and rotated. The primary threads 30, 50 have a relatively large thread angle, so that a relatively large vertical displacement is effected by a relatively small rotation. As the cap member rises, the fluid chamber 22 is lifted away from the plug member 42. When the upper seal 66 of the bottom wall 24 passes above the top of the plug member 42, as shown in FIG. 2, the main liquid compartment 14 comes into fluid communication with the fluid chamber 22, and the pressurised liquid additive 120 is free to pass between the upper seal 66 and the outer surface 62 of the plug member 42, into the internal fluid passage 70, along the nozzle passage 61 and out of the nozzle 60 into the main liquid compartment 14. A lower seal 68 in the bottom wall 24 continues to seal between the bottom wall 24 and the plug member 42, so that the liquid additive 120 cannot leak into the main liquid compartment 14 along any other path. Typically the primary thread 30, 50 is a standard 30/25 PET bottle thread with 9 mm pitch, of the type used with PET water bottles, and the closure device 10, 110 is arranged so that the liquid additive 120 is fired into the main liquid compartment 14 when the cap member is rotated 45° from the closed position.

The volume of the head space 122 is chosen to be sufficiently large so that all the liquid additive 122 is expelled into the main liquid compartment 14. The top surface 76 of the bottom wall 24 slopes down towards the aperture 25, so that under gravity all the liquid additive flows to the aperture. The upper end of the plug member 42 is also shaped to ensure that any liquid thereon drains to the perimeter of the plug member 42.

The known closure device 10 illustrated in FIGS. 1 and 2 works effectively with bottles 12 in which the main liquid compartment 14 is at atmospheric pressure, for example with still water. However when it is used with a bottle containing a carbonated beverage so that the main liquid compartment 14 is at a pressure greater than atmospheric pressure, firing the additive 120 into the beverage causes the beverage to froth excessively, such that when the cap member 20 and housing 40 are removed from the neck 16, both $CO_2$ and liquid are forced up between the housing inner wall 46 and the neck 16, over the top of the neck 16 beneath the web 45 and down between the housing outer wall 44 and the neck 16. This results in spillage of the liquid or beverage from the container as the closure device 10 is removed from the bottle 12.

The present invention overcomes this problem by providing a vent path for $CO_2$ or other pressurised gases in the firing position, while preventing liquid from travelling along the vent path.

A first embodiment of a closure device 110 according to the present invention is illustrated in FIG. 3. The closure device 110 is similar to the closure device 10 of FIGS. 1 and 2, and so the same reference numerals are used to denote the same components, which are not described further below. The description of FIGS. 1 and 2 is to be read in conjunction with the following description of the present invention. The plug member 42 and fluid chamber or tank 22 are identical and are not illustrated further in FIG. 3. The outer cap wall 28 includes an internal primary thread 30 adapted to engage a corresponding external primary thread 50 on the housing 40. Together the internal and external primary threads 30, 50 form part of the primary engagement means which allow the cap member 20 to be lifted relative to the housing 40. However the primary threads 30, 50 have been omitted from FIG. 3 for clarity. The anti-tamper strip 80 and anti-tamper device 100 are also present in the closure device 110, but have been omitted from FIG. 3 for clarity.

In FIG. 3 the closure device 110 is in the firing position, corresponding to the firing position of the closure device 10 illustrated in FIG. 2. A seal 124 is provided below the web 45 of the housing 40, so that there is no fluid path between the housing and the neck until the closure device 110, including the housing 40, is removed.

A further seal 126 is provided on the underside of the top wall 26 of the cap member 20, between the outer cap wall 28 and the inner cap wall 32. This seal 126 serves to seal between the outer cap wall 28 and the web 45 of the inner housing wall 46 when the closure device 110 is in the closed position, equivalent to the position of the closure device 10 in FIG. 1. This ensures that there is no passage for pressurised gas or liquid between the cap member 20 and the housing 40 when the closure device 110 is in the closed position.

The housing 40 of the closure device 110 of FIG. 3 differs from the housing 40 illustrated in FIGS. 1 and 2 in that the inner housing wall 46 includes one or more apertures 130 arranged around the circumference of the inner housing wall 46. Each aperture 130 is closed with a porous or gas-permeable membrane 132 which permits the passage of gas but prevents the passage of liquid. Typically this may be a sintered plastic or the like. The plastic may be polypropylene, polyethylene or any other suitable material. However the invention is not limited to sintered plastic and any membrane or arrangement of apertures which allows the passage of gas but prevents the passage of liquid may be used instead of a sintered plastic membrane. The membrane 132 may be provided in the aperture 130 as shown in FIG. 3, or may be provided on one face of the inner housing wall 46 to cover the aperture 130.

As the cap member 20 is raised relative to the housing 40, in order to fire the closure device 110, the seal 126 is raised from the web 45, thereby opening a fluid communication path as indicated by the arrows A. The presence of the membrane 132 in the fluid communication path ensures that only gas is free to travel along the fluid communication path, so the path serves as a vent path for pressurised gas in the container 12. The vent path passes between the housing inner wall 46 and the neck 16, through the membrane 132, over the web 45 of the housing 40, and finally between the housing outer wall 44 and the outer cap wall 28, from where it vents to the atmosphere. When passing between the housing outer wall 44 and the outer cap wall 28 the vent path passes around the threads of the primary engagement means.

The seal 54 continues to provide a seal between the housing inner wall 46 and the inner cap wall 32 below the apertures 132, so that there is no possible liquid leak path which bypasses the membrane 132.

Thus the pressure in the main liquid compartment 14 is reduced to atmospheric pressure as the closure device 110 is fired and liquid additive 120 is expelled into the main liquid compartment 14, as described with reference to FIGS. 1 and 2, so that when the closure device is removed from the threaded neck 16 no leaking or spilling of liquid occurs.

Variations are possible. For example the seals 54, 124, 126 may take a different shape or form. The gas permeable membrane may be of any suitable shape or material, and its location may be altered, provided that it continues to serve the purpose of providing a vent path for gas from the main liquid compartment 14 to the atmosphere when the closure device 110 is raised to the firing position, but before the closure device 110 is removed from the neck 16 of the bottle 12. The liquid additive 120 may be a flowable solid, such as a gel, powder or suspension, which can be expelled through the nozzle 60. The plug member 42 and nozzle 60 are not limited to the arrangement shown in FIGS. 1 and 2, but can take any form as long as they achieve the function of keeping the pressurised fluid chamber 22 closed in the closed position, and providing a flow path from the fluid chamber 22 in the firing position.

Referring now to FIGS. 4 to 7, there is illustrated a further embodiment of a closure device 210 according to the present invention. The closure device 210 is secured to a neck 16 of a container 12 in exactly the same way as in the embodiment of FIG. 3. However the neck 16 is omitted from the drawings for clarity. Also omitted is the internal thread 52 on the outer housing wall 44 which engages with the thread 18 on the neck, and the external thread 50 on the outer housing wall 44 which engages with the internal thread 30 on the outer cap wall 28. Other components which correspond to the components of the closure devices 10, 110 of FIGS. 1 to 3 are provided with the same reference numeral.

Figure 4:
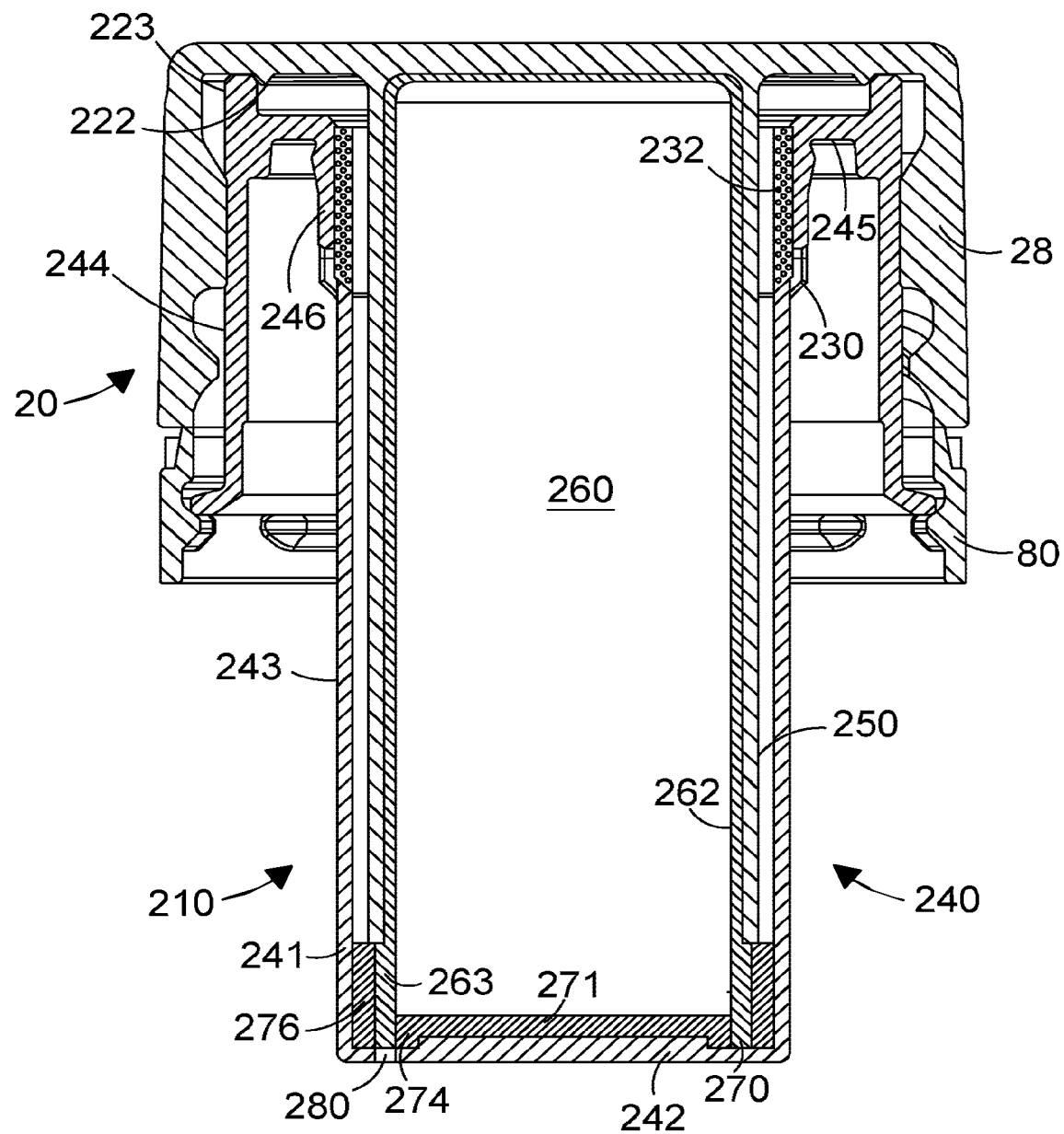
FIGS. 4 and 5 are cross-sectional views through another embodiment of a closure device according to the invention in a closed position and a firing position respectively.
Figure 6:
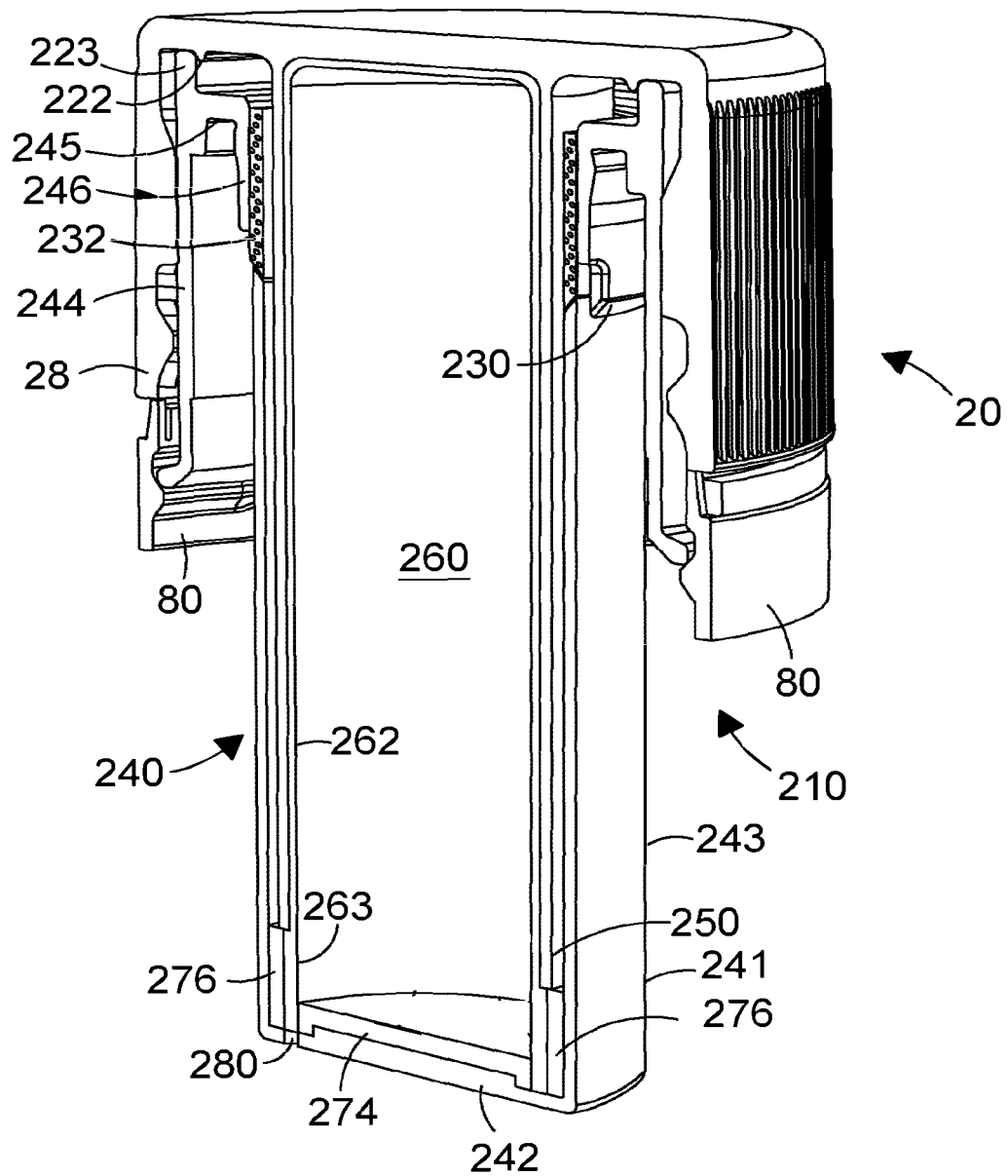
FIGS. 6 and 7 are sectional isometric views of the embodiment of FIGS. 4 and 5 in the closed and firing positions respectively.

The closure device 210 differs from the closure device 110 in the nature of the tank 122, inner housing wall 146 and plug member 142. In FIGS. 4 and 6 the closure assembly 210 is in a first closed position.

The closure assembly 210 includes a cap member or closure 20. A fluid chamber or tank 260 is connected to the closure 20. The cap member 20 includes a cylindrical wall 250 which surrounds the tank 260, which may be formed separately. The closure 20 is bonded or moulded to the tank 260. For example the tank 260 may be formed of a barrier plastic such as PBT and the cap member 20 may be formed of polypropylene or other suitable material by over-moulding.

A separate housing 240 sits inside the neck 16 of the bottle. The housing 240 includes a sleeve portion 241 having a cylindrical wall 243 which surrounds the tank 260 and has a plug member 242 at its lower end. At its upper end the housing 240 includes an inner cylindrical wall 246 and an outer cylindrical wall 244. A web portion 245 connects the inner and outer cylindrical walls 246, 244. The outer wall 244 includes an internal thread (not shown) which engages with the standard thread (not shown) on the bottle neck 16, and is used to secure the housing 240 to the bottle neck 16.

The fluid chamber 260 contains an additive liquid (not shown) and a pressured propellant fluid. The fluid held in the fluid chamber 260 may be of significantly greater pressure than the beverage held in the container. The fluid chamber 260 is enclosed by a fluid chamber wall 262. The fluid chamber 260 may be formed using plastic injection moulding and may be formed of PET or any other suitable plastic. In the example of FIGS. 4 to 7 the fluid chamber 260 is formed as a separate blow moulded chamber and secured to the closure 20 by moulding the closure 20 around it. However the fluid chamber 260 may be simply bonded to the closure by adhesive or formed by any other means.

The housing 240 and the plug member 242 may be formed by injection moulding or another suitable method.

In the closed position of FIGS. 4 and 6 the fluid chamber 260 is sealed closed by a valve arrangement comprising the plug member 242 which engages with an annular boss member 263 forming a bottom aperture 264 in the tank 260. The annular boss member 263 is formed from an open end of the cylindrical wall 262 of the tank 260. In the example the annular boss member 263 has a wall thickness greater than the remainder of the tank wall 262. The plug member 242 has an annular channel 270 arranged in the first upper side 272 of the plug member 242.

The channel 270 has a seals 274, 276 provided to seal between the plug member 242 and the annular boss member 263 in the closed position of FIGS. 4 and 6.

The annular channel 270 has one or more orifices 280 extending from the channel to the underside of the plug member 242.

The cap member 20 and tank 260 may be raised relative to the housing 240 by turning the cap member 20 relative to the housing 240 through the action of internal and external primary threads (not shown) on the cap member 20 and housing 240, which form a primary engagement means which allows the cap member 20 to be lifted relative to the housing 240, as is described with reference to FIGS. 1 to 3.

In an alternative embodiment the external threads on the outer wall 244 of the housing 240 and the internal threads on the outer wall 28 of the cap member 20 can be replaced by a bayonet coupling arrangement so that the cap member 20 is first turned without lifting, and then lifted without turning.

In an alternative embodiment the external threads on the outer wall 244 of the housing 240 and the internal threads on the outer wall 28 of the cap member 20 can be omitted so that the closure 20 and tank 260 lift relative to the housing 240 and plug member 242 by action of the internal pressure in the tank 260 once the tamper band 80 has been removed.

One or more apertures 230 are arranged around the circumference of the inner housing wall 246. Each aperture 230 is closed with a porous or gas-permeable membrane 232 which permits the passage of gas but prevents the passage of liquid. The apertures 230 are thus gas-permeable, but are preferably substantially liquid-impermeable. Typically the membrane 232 may be a sintered plastic or the like. The plastic may be polypropylene, polyethylene or any other suitable material. However the invention is not limited to sintered plastic and any membrane or arrangement of apertures which allows the passage of gas but prevents the passage of liquid may be used instead of a sintered plastic membrane. The membrane 232 may be provided on the inner face of the inner housing wall 246 to cover the aperture 230, as shown in FIGS. 4 to 7, or may be provided in the aperture 230, or on the outer face of the inner housing wall 246 to cover the aperture 230.

A circumferential seal 222 is provided on the underside of the cap member 20 to seal against an upstand 223 on the web 245 of the housing 240 when the closure assembly 210 in the closed position. The seal 222 and upstand 223 form first and second sealing means respectively. The sealing means prevent gas passing through the membrane 232 and venting to the atmosphere when the closure assembly 210 in the closed position.

Figure 5:
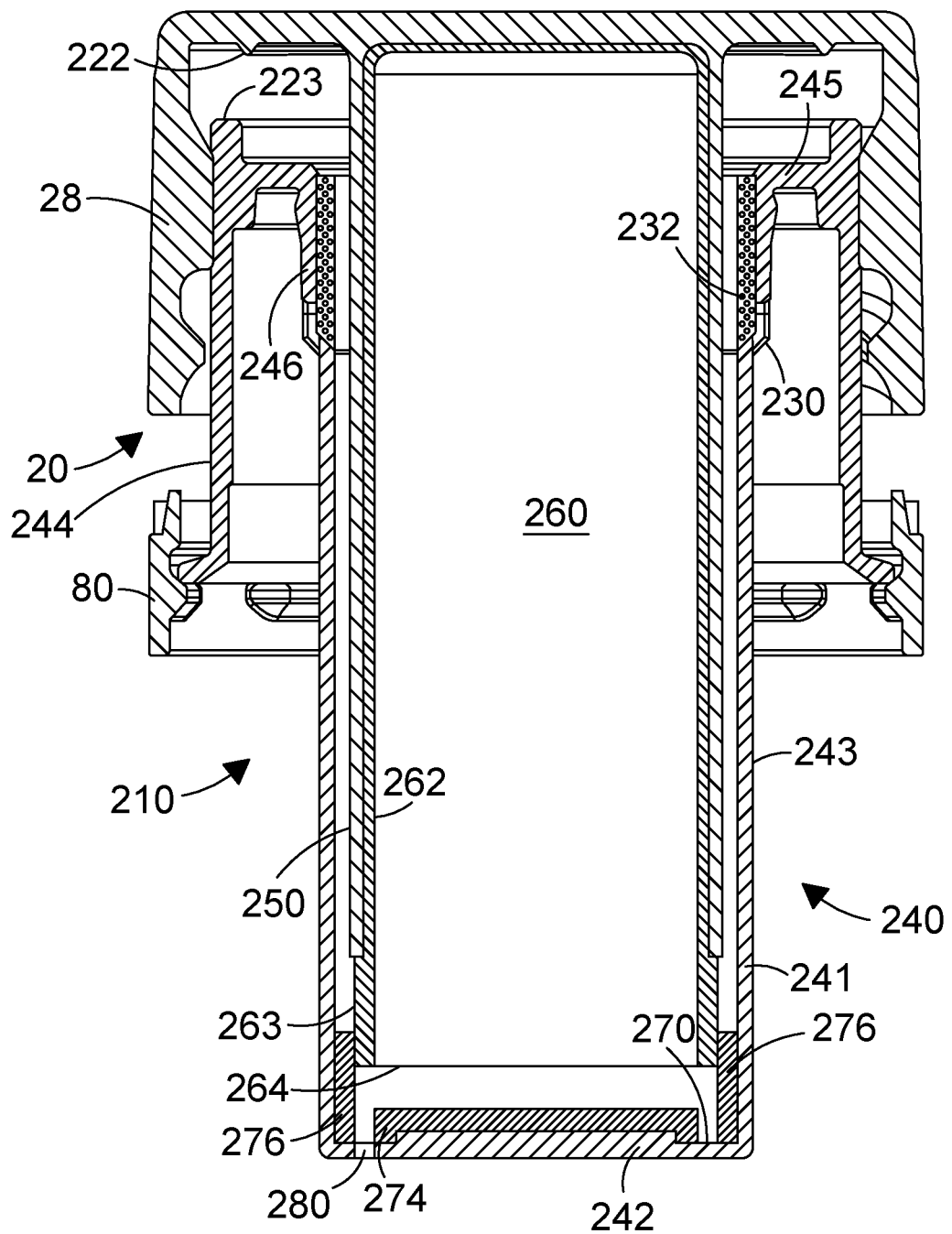
Figure 7:
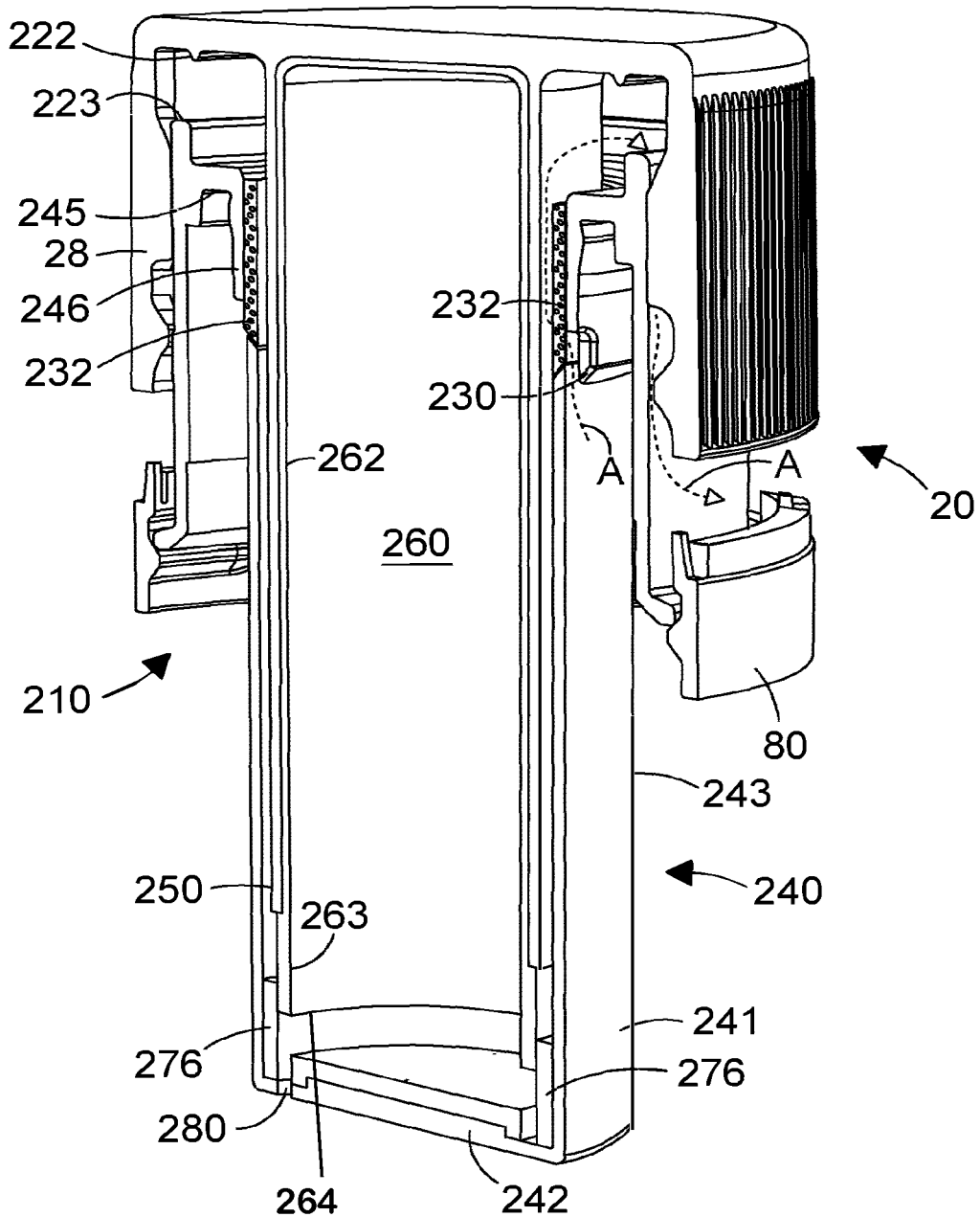

FIGS. 5 and 7 show the closure assembly 210 in the open or firing position. The frangible portion or tamper band 80 has been separated from the closure 20, and the closure 20 and tank 260 have been raised relative to the housing 240 and plug member 242, so that the plug member 242 is no longer fully engaged with the open end of the tank 260. The annular boss member 263 is no longer engaged in the annular channel 270. The orifices 280 are now in communication with the interior volume of the tank 260, so that the liquid additive is fired through the orifices in a "shower head" pattern under the action of the pressurised propellant in the tank 260. The "shower head" pattern encourages mixing and distribution of the liquid additive in the beverage (not illustrated) in the container 12 to which the closure assembly 210 is attached.

At the same time a vent path or fluid communication path, as indicated by the arrows A, is provided between the cylindrical wall 243 of the sleeve portion 241 of the housing 240 and the neck 16 of the bottle 12, through the apertures 230 and membranes 232, between the now separated circumferential seal 222 and upstand 223, between the outer housing wall 244 and outer cap wall 28 to the atmosphere, so that pressurised gas from inside the bottle can escape, while liquid cannot pass through the membranes 232.

A further detent or stop mechanism (not shown) may be provided to prevent further rotation of the closure 20 relative to the housing 240, so that further rotation of the closure 20 causes both the closure and housing 240 to be lifted on the threads of the neck 16 of the bottle 12 so that the closure assembly 210 can be removed from the neck 16 of the bottle 12.

The seal 276 continues to provide a seal between the cylindrical wall 243 of the housing 240 and the wall 262 of the tank or fluid chamber 260, so that there is no possible liquid leak path which bypasses the membranes 232.

Thus the pressure in the main liquid compartment 14 or bottle interior is reduced to atmospheric pressure as the closure device 210 is fired, so that when the closure device is removed from the threaded neck 16 no leaking or spilling of liquid occurs.

Variations are possible. For example the seals 274, 276, 222, 223 may take a different shape or form. The gas permeable membrane 232 may be of any suitable shape or material, and its location may be altered, provided that it continues to serve the purpose of providing a vent path for gas from the main liquid compartment 14 to the atmosphere when the closure device 210 is raised to the firing position, but before the closure device 210 is removed from the neck 16 of the bottle 12.

Figure 8:
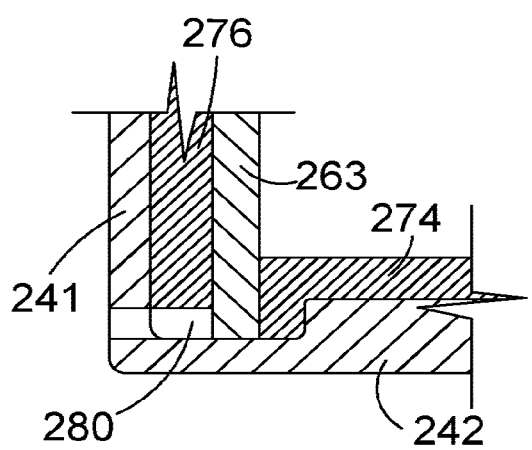
FIGS. 8 and 9 are partial cross-sectional views of the embodiment of FIGS. 4 and 5 showing first and second alternative locations for the orifice respectively.
Figure 9:
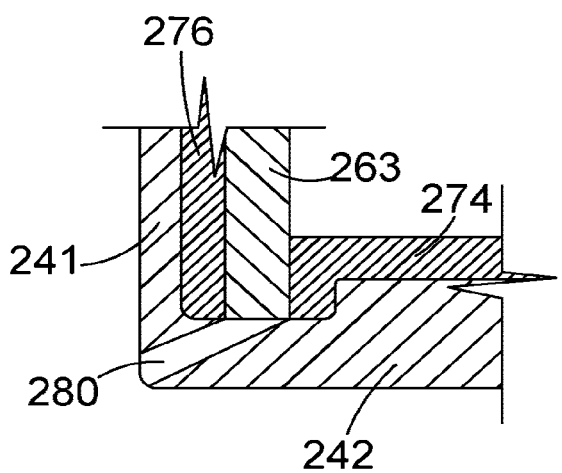

In FIGS. 4 to 7 the orifice 280, which serves as a nozzle 280, is shown as being vertical. This maximises mixing, because it fires the liquid additive directly onto the surface of the beverage in the bottle 12. However in certain circumstances it may be required to minimise turbulence and frothing in the beverage, so the orifice 280, or at least the outlet of the orifice 280, can instead be directed to be horizontal, as shown in FIG. 8, or at an angle, as shown in FIG. 9.

Modifications and variations are possible without departing from the scope of the invention.

The invention claimed is:

1. A closure device for releasing an additive liquid into a main liquid compartment of a container having an opening with a neck, the assembled closure device comprising a cap member and a housing,
   wherein the cap member includes a pressurised tank containing the additive liquid and having a bottom aperture therein,
   wherein the housing is adapted to engage with the neck and includes a plug member sealingly engageable with the bottom aperture,
   wherein the plug member includes a nozzle directed away from the fluid chamber pressurised tank,
   wherein the pressurised tank has an interior volume and a cylindrical wall, the bottom aperture comprises an open end of the cylindrical wall portion and the plug member includes an annular channel adapted to sealingly engage with the open end of the cylindrical wall of the pressurised tank, and the nozzle comprises one or more orifices provided in the annular channel,
   wherein the cap member and housing are arranged to permit movement of the cap member relative to the housing from a first armed or closed position of the closure device in which the plug member closes the bottom aperture to a second firing position of the closure device in which the plug member is at least partially withdrawn from the bottom aperture to provide a communication path in use from the pressurised tank through the nozzle to the main liquid compartment,
   wherein the closure device includes a first sealing means arranged on the cap member and a second sealing means arranged on the housing to provide a fluid seal between the housing and the cap member when the closure device is in the first armed position and to provide a fluid path between the housing and the cap member when the closure device is in the second firing position, and
   wherein the housing includes one or more gas permeable apertures which are substantially liquid impermeable, the gas permeable apertures arranged in fluid communication between the fluid path and the main liquid compartment when the closure device is in the second firing position.

2. The closure device of claim 1, wherein the cap member is provided with a primary engagement means which engages with a corresponding primary engagement means provided on the housing to allow the cap member to be rotated or lifted relative to the housing from the first armed or closed position of the closure device to the second firing position of the closure device.

3. The closure device of claim 1, wherein the first sealing means is a circumferential rib on an underside of the cap member and the second sealing means is a circumferential projection on the housing adapted to engage with the rib in the first closed position.

4. The closure device of claim 1, wherein the first sealing means is a resilient seal provided on an underside of the cap member and the second sealing means is a web member of the housing adapted to engage with the resilient seal in the first closed position.

5. The closure device of claim 1, wherein each of the one or more gas permeable apertures is arranged in an inner cylindrical wall of the housing which surrounds the tank.

6. The closure device of claim 1, wherein each of the one or more gas permeable apertures comprises an aperture closed by a gas permeable membrane.

7. The closure device of claim 6, wherein the gas permeable membrane may comprises sintered plastic.

8. The closure device of claim 1, wherein each of the one or more orifices comprises an outlet angled away from a longitudinal axis of the neck of the container.

9. The closure device of claim 1, wherein the plug member includes a stopper portion adapted to project inside the open end of the cylindrical wall of the pressurised tank in the first closed position.

10. The closure device of claim 9, wherein the plug member includes at least one of:
a seal in the annular channel adapted to seal between the plug member and an internal surface of the cylindrical wall in the first closed position; and
a seal in the annular channel adapted to seal between the plug member and an external surface of the cylindrical wall in the second firing position.

11. The closure device of claim 1, wherein the housing includes a sleeve portion which at least partially surrounds the pressurised tank, a cylindrical inner wall adapted to fit inside a neck of a container and a cylindrical outer wall connected to the cylindrical inner wall by a bridge portion, the cylindrical outer wall having an internal thread on its inner surface adapted to engage with an external thread on a neck of a container.

12. The closure device of claim 11, wherein the cap member has an outer wall adapted to fit around the outer wall of the housing, the outer wall of the cap member having a detent member for engaging a corresponding detent member on the outer wall of the housing, the detent members being adapted to hold the closure assembly in the first closed position.

13. The closure device of claim 11, wherein the cylindrical inner wall of the housing has a first circumferential rib on its inner surface adapted to engage with a first detent portion provided on an external surface of the cylindrical wall of the pressurised tank when the closure assembly is in the second firing position to prevent the tank separating from the housing.

14. A container comprising a main liquid compartment and having an opening with a neck, the container being closed by a closure device according to claim 1 secured to the neck of the container, wherein the main liquid compartment contains a carbonated liquid or carbonated beverage.

15. A method of introducing an additive liquid into a carbonated beverage in a main liquid compartment of a container having an opening with a neck, the neck being closed by a closure device comprising a cap member and a housing secured to the neck of the container,
wherein the cap member includes a pressurised tank containing the additive liquid and a propellant, and having a bottom aperture therein,
wherein the housing includes a plug member sealingly engageable with the bottom aperture,
wherein the plug member includes a nozzle directed away from the fluid chamber pressurised tank,
wherein the pressurised tank has an interior volume and a cylindrical wall, the bottom aperture comprises an open end of the cylindrical wall portion and the plug member includes an annular channel adapted to sealingly engage with the open end of the cylindrical wall of the pressurised tank, and the nozzle comprises one or more orifices provided in the annular channel,
the method comprising the steps of:
moving the cap member relative to the housing from a first armed or closed position of the closure device in which the plug member closes the aperture to a second firing position of the closure device in which the plug member is at least partially withdrawn from the bottom aperture to provide a communication path in use from the tank through the nozzle to the main liquid compartment,
firing the liquid additive under action of the propellant into the main liquid compartment, thereby mixing the liquid additive with the carbonated beverage,
opening a vent path from the main liquid compartment to the outside of the container through a gap between the cap member and housing, wherein the vent path includes one or more gas permeable apertures which are substantially liquid impermeable arranged in fluid communication with the main liquid compartment,
permitting gas to pass through the one or more gas permeable apertures along the vent path to the outside of the container to reduce the pressure inside the main liquid compartment to atmospheric pressure, and
simultaneously preventing the carbonated beverage from passing through the one or more gas permeable apertures along the vent path to the outside of the container.

16. The method of claim 15, wherein the step of opening a vent path from the main liquid compartment to the outside of the container through a gap between the cap member and housing includes separating a first sealing means arranged on the cap member from a second sealing means arranged on the housing.

* * * * *

UNITED STATES PATENT AND TRADEMARK OFFICE
CERTIFICATE OF CORRECTION

PATENT NO. : 11,001,425 B2
APPLICATION NO. : 16/483648
DATED : May 11, 2021
INVENTOR(S) : Jordan Maguire and Bernard Frutin It is certified that error appears in the above-identified patent and that said Letters Patent is hereby corrected as shown below:

In the Claims

In Column 12, Claim 1, Line 27: delete "fluid chamber"

In Column 13, Claim 7, Line 16: delete "may"

In Column 14, Claim 15, Line 15: delete "fluid chamber"

Signed and Sealed this
Fifth Day of October, 2021

Drew Hirshfeld
*Performing the Functions and Duties of the
Under Secretary of Commerce for Intellectual Property and
Director of the United States Patent and Trademark Office*